United States Patent
Elmar et al.

(10) Patent No.: US 11,519,472 B2
(45) Date of Patent: Dec. 6, 2022

(54) MULTI-PART BRAKE ROTOR

(71) Applicant: SAF-HOLLAND GmbH, Bessenbach (DE)

(72) Inventors: Weber Elmar, Dülmen (DE); Thomas Josef Naber, Ahaus (DE); Stefan Wallmeier, Goldbach (DE); Michael Roos, Marktheidenfeld (DE)

(73) Assignee: SAF-HOLLAND GmbH, Bessenbach (DE)

( * ) Notice: Subject to any disclaimer, the term of this patent is extended or adjusted under 35 U.S.C. 154(b) by 292 days.

(21) Appl. No.: 16/645,713

(22) PCT Filed: Aug. 13, 2018

(86) PCT No.: PCT/EP2018/071887
§ 371 (c)(1),
(2) Date: Mar. 9, 2020

(87) PCT Pub. No.: WO2019/057399
PCT Pub. Date: Mar. 28, 2019

(65) Prior Publication Data
US 2020/0278003 A1      Sep. 3, 2020

(30) Foreign Application Priority Data

Sep. 19, 2017 (DE) ............... 10 2017 121 633.2

(51) Int. Cl.
*F16D 65/12* (2006.01)
*F16D 65/02* (2006.01)

(52) U.S. Cl.
CPC ...... *F16D 65/123* (2013.01); *F16D 2065/136* (2013.01); *F16D 2065/1312* (2013.01);
(Continued)

(58) Field of Classification Search
CPC ............................................. F16D 65/123–128
(Continued)

(56) References Cited

U.S. PATENT DOCUMENTS

| 6,374,956 | B1 * | 4/2002 | Naeumann | ............. F16D 65/12 188/18 A |
| 6,619,440 | B2 * | 9/2003 | Antony | .................. F16D 65/12 188/18 A |

(Continued)

FOREIGN PATENT DOCUMENTS

| DE | 19617154 A1 | 11/1997 |
| DE | 19915215 A1 | 10/2000 |

(Continued)

OTHER PUBLICATIONS

European Patent Office; International Search Report; dated Nov. 7, 2018.

*Primary Examiner* — Christopher P Schwartz
(74) *Attorney, Agent, or Firm* — Price Heneveld LLP

(57) ABSTRACT

A brake rotor, includes at least one friction element and one adapter element, wherein the brake rotor is configured to rotate about an axis of rotation, wherein the friction element has at least one friction surface and one connection region, wherein the adapter element has an installation region and a transfer region, wherein the installation region is configured for fixing the brake rotor to a hub, wherein the connection region indirectly or directly engages in positively locking fashion in a circumferential direction with the transfer region such that a torque about the axis of rotation can be transferred between the connection region and the transfer region from the friction element to the adapter element.

27 Claims, 9 Drawing Sheets

(52) U.S. Cl.
CPC ............... *F16D 2065/1392* (2013.01); *F16D 2250/0053* (2013.01)

(58) Field of Classification Search
USPC .................................. 188/17, 18 A, 218 XL
See application file for complete search history.

(56) References Cited

U.S. PATENT DOCUMENTS

| | | | |
|---|---|---|---|
| 8,584,815 B2 * | 11/2013 | Hester ..................... | F16D 65/12 |
| | | | 188/218 XL |
| 9,291,227 B2 * | 3/2016 | Burgoon ................. | B60T 8/329 |
| 2007/0175715 A1 | 8/2007 | Pahle | |
| 2007/0193837 A1 * | 8/2007 | Lamb ...................... | F16D 65/12 |
| | | | 188/218 XL |
| 2008/0149435 A1 | 6/2008 | Burgoon et al. | |
| 2010/0032251 A1 | 2/2010 | Bradley et al. | |

FOREIGN PATENT DOCUMENTS

| | | | | |
|---|---|---|---|---|
| DE | 10125111 A1 | 12/2002 | | |
| DE | 10257719 A1 | 7/2004 | | |
| DE | 10305237 A1 | 8/2004 | | |
| DE | 102010026728 A1 | 1/2012 | | |
| DE | 102011120438 A1 | 12/2012 | | |
| DE | 102013001322 A1 * | 7/2014 | ........... | F16D 65/125 |
| DE | 102014107228 A1 | 11/2015 | | |
| DE | 102015007448 B3 | 9/2016 | | |
| EP | 0872659 A1 | 10/1998 | | |
| EP | 1918605 A1 * | 5/2008 | .............. | B60T 8/329 |
| FR | 2762653 A1 * | 10/1998 | ............... | F16D 1/08 |
| FR | 2938311 A1 | 5/2010 | | |
| GB | 1080035 A | 8/1967 | | |
| WO | WO-9500771 A2 * | 1/1995 | ........... | F16D 65/123 |

\* cited by examiner

MULTI-PART BRAKE ROTOR

BACKGROUND OF THE INVENTION

The present invention relates to a multi-part brake rotor, in particular for utility vehicles.

Brake rotors for utility vehicles are well known from the prior art—in the form of brake disks and brake drums. In order to primarily keep the costs of the manufacture of brake rotors low, multi-part embodiments of brake rotors are also known from the prior art. These multi-part embodiments have in common the fact that the torque is transferred by non-positive locking between the individual elements of the brake rotor. This type of torque transfer has, inter alia, the disadvantage that the individual components of the brake rotor slip relative to one another in the event of highly dynamic torque fluctuations, which can under some circumstances result in a failure of the connection. Such a failure must however be avoided as far as possible owing to the relevance of brake rotors from a safety aspect.

It is therefore an object of the present invention to provide a brake rotor, in particular for utility vehicles, which provides a high level of safety.

SUMMARY OF THE INVENTION

According to the invention, a brake rotor, in particular for utility vehicles, comprises at least one friction element and one adapter element, wherein the brake rotor is designed to rotate about an axis of rotation, wherein the friction element has at least one friction surface and one connection region, wherein the adapter element has an installation region and a transfer region, wherein the installation region is designed for fixing the brake rotor to a hub, wherein the connection region indirectly or directly engages in positively locking fashion in a circumferential direction with the transfer region such that a torque about the axis of rotation can be transferred between the connection region and the transfer region from the friction element to the adapter element. A brake rotor of the type in question may for example be a drum of a brake drum or else a brake disk of a disk brake. The axis of rotation may in particular be the axis of rotation of the shaft or of the axle that is to be braked by the brake rotor. The friction element of the brake rotor is designed to come into contact with a further element—such as for example a brake pad—in order to generate a braking torque. The surface or surfaces which can come into contact with the further element for the purposes of generating a braking torque form the friction surfaces of the friction element. In particular, the friction element may be formed in this case by the shell region of a brake drum or the friction ring of an internally ventilated or non-ventilated brake disk. The connection region of the friction element serves for transferring forces and/or torques from the friction element to the adapter element and can thus in particular perform the task of bearing the friction element. The transfer region of the adapter element serves for accommodating forces and/or torques from the friction element. In other words, the transfer region of the adapter element can thus form a type of counterpart or partner for the connection region of the friction element. Here, the torque transfer takes place such that the connection region is indirectly or directly in positively locking engagement with the transfer region. The expression "indirectly or directly in positively locking engagement" can be understood to mean either that the transfer regions themselves make positively locking contact with the connection regions in the circumferential direction or that, in the effect chain of the torque transfer between the connection region and the transfer region, there is at least one instance of positive locking in the circumferential direction—for example by means of interposed elements. By means of this positive locking, a high level of safety is achieved, because, by means of this type of torque transfer, even highly dynamically fluctuating torques can be transferred reliably. The torque about the axis of rotation that is to be transferred (braking torque) may in this case be realized predominantly by means of the positively locking transfer. Preferably, the torque transfer takes place such that the fraction transferred in positively locking fashion amounts to more than 95% of the total torque about the axis of rotation. It is particularly preferable if the torque transfer about the axis of rotation takes place entirely in positively locking fashion. The circumferential direction is the direction encircling the axis of rotation in a polar fashion, or else angle coordinates about the axis of rotation. The installation region of the adapter element serves in particular for being fixed to a hub or shaft. For this purpose, it is particularly expedient if the installation region is, at least in certain regions, of rotationally symmetrical form about the axis of rotation. The connection region and the transfer region may be designed such that the projections of said two regions onto the axis of rotation overlap at least in certain regions. It is however particularly preferable if the projection of the connection region or of the transfer region to the axis of rotation surrounds the projection of the respective other region onto the axis of rotation. In this way, a particularly small structural space requirement of the brake rotor can be achieved. It is alternatively preferable if the projections of the connection regions and of the transfer regions onto the axis of rotation are arranged adjacent to one another or spaced apart from one another. By means of this spatial arrangement of the connection regions relative to the transfer regions, particularly efficient thermal decoupling of the two constituent parts of the brake rotor can be achieved.

The adapter element is expediently of multi-part form, in particular in the axial direction and/or in the circumferential direction. The axial direction is oriented so as to point parallel to the axis of rotation. A multi-part adapter ring is to be understood to mean that said adapter ring is not composed of a single component but is constructed from multiple elements and is in particular not formed by cohesive joining of individual elements. By means of the regions of said multiple elements which make contact with one another, a particularly high level of damping is achieved, in particular by way of microfriction. The adapter element is preferably formed, in the axial direction, from multiple components or elements, in particular six to fifteen elements. The multi-part form of the adapter element in the axial direction is advantageous in particular because most of the vibration modes of the brake rotor, which are also known as brake squeal, cause a particularly large relative movement between the individual elements in the case of an axial multi-part form of the adapter element. It is alternatively preferable or additionally preferable if the adapter element is of multi-part form in the circumferential direction. In this way, particularly simple installation of the adapter element can be realized. It may be particularly expedient for intermediate spaces to be formed between the elements in the circumferential direction, which intermediate spaces can act inter alia as cooling channels. In order to realize a high level of damping, the adapter element may have between three and six elements in the circumferential direction. If the adapter element is of multi-part form both in the axial direction and in the circumferential direction, it may be preferable for multiple layers to be formed in the axial direction, which layers are offset with respect to one another in the circumferential direction. It is achieved in this way that the individual layers are secured in a positively locking manner against one another in the axial direction. The individual elements of the adapter element may be formed from sheet metal, in particular sheet steel. In other words, the adapter element may be composed of a pack of metal sheets. A particularly inexpensive construction can be realized in this way. Here, the material thickness of the sheet-metal elements of the adapter element advantageously lies between 1 and 4 mm. It is particularly preferable if the material thickness lies between 1.5 and 3 mm. It has been found that, in the case of such a sheet-metal thickness, a particularly good compromise can be achieved between stiffness and damping of the adapter element. To realize particularly advantageous thermal decoupling, it is expedient if all or at least some elements of the adapter ring are coated in certain regions or entirely with a ceramic. To save costs, it is also possible for only the installation and/or the transfer region to be coated with a ceramic.

It is preferable for a constituent part of the adapter element to be a pole wheel for an ABS sensor. By means of this integral design, an inexpensive and structural-space-saving brake configuration can be realized. The constituent part that forms the pole wheel does not serve for transferring or accommodating forces or torques in any way. It is preferable for that region of the adapter element which forms the pole wheel to also be of multi-part form in the circumferential direction. A particularly inexpensive variant of a pole wheel is made possible in this way. It is expedient here if the various elements that form the pole wheel are composed of different materials. In this way, the temperature of the brake rotor can be inferred on the basis of the deformation caused by the heat. Inter alia, it is thus possible for the rotational speed of the brake rotor to be indirectly measured, and for this information to be additionally processed in or fed to an ABS system. In order to realize a compact design in particular in the radial direction, the regions that form the pole wheel may extend radially inward.

The connection region advantageously has at least three connection portions, and wherein the transfer region has at least three complementary transfer portions. The transfer portions, which are a constituent part of the adapter element, and the connection portions, which are in turn a constituent part of the friction element, may be recesses, such as for example bores, slots or grooves. The slots or grooves expediently extend, in their extent direction, in a radial direction. Alternatively, the connection portions and/or the transfer portions may also be formed by a separate element, which is however formed as a single piece with the friction element or with the transfer portion respectively. In other words, the connection portions and/or the transfer portions may thus be protruding elements such as teeth, for example. The connection portions and/or the transfer portions may be symmetrical with respect to a plane in order to realize inexpensive manufacture. Said planes of symmetry expediently extend radially away from the axis of rotation. The transfer portions and/or the connection portions may extend both in the axial direction—in order to realize particularly good lubrication characteristics of the brake rotor—and/or in the radial direction—in order to ensure a small structural space requirement. "Complementary" may inter alia be understood to mean that the transfer portion indirectly or directly has a direct operative connection, with positively locking engagement, to the complementary connection portion. In other words, this may mean that the transfer portions engage either directly or indirectly—through the use of intermediate elements—with the complementary connection portions such that a torque about the axis of rotation can be transferred. The transfer portion which is complementary to a connection portion may in particular be that transfer portion which is spatially closest to a connection portion. For the torque transfer, the transfer portions and/or the connection portions expediently comprise one, but preferably at least two, three or four, contact surfaces, wherein the contact surfaces are designed to come into contact with another component in order to transfer a torque about the axis of rotation to the other component, in particular in positively locking fashion.

Preferably, the connection portions each exhibit play in a radial direction in relation to the respective complementary transfer portions. "Exhibit play" may be understood inter alia to mean that the connection portions are theoretically, considered on their own, displaceable, in particular in the radial direction, relative to the corresponding transfer region. By means of this embodiment, it is achieved that, even in the event of large temperature fluctuations, there is a low tendency for cracks to form. The radial direction is expediently the direction extending radially away from the axial direction or the axis of rotation. In particular, it is thus the case that the axial direction, the circumferential direction and the radial direction form a cylindrical coordinate system, the origin of which may lie on the axis of rotation of the brake rotor.

Reinforcement elements are expediently arranged on the connection portions and/or the transfer portions. In this way, a reduction of the contact pressure at the connection portions or the transfer portions can be achieved. In order to avoid corrosion, the reinforcement element is preferably formed from a higher-grade material than the friction element and the adapter element respectively. It is particularly preferable if the reinforcement element is formed from high-grade steel. The ratio of the wall thickness of the reinforcement element to the length of the reinforcement element in the axial direction expediently lies in a range from 0.02 to 0.3, such that a small structural space requirement can be achieved. The ratio however preferably lies in a range from 0.03 to 0.2, in order to be able to produce a particularly inexpensive reinforcement element owing to low manufacturing outlay and good dimensional stability. The ratio particularly preferably lies in a range from 0.05 to 0.17, because it has been found that, with such a ratio, there is only a low tendency for cracks to form in the reinforcement element.

The connection portions preferably extend in the axial direction proceeding from an axial face surface of the friction element, and/or wherein the transfer portions extend in the axial direction proceeding from an axial face surface of the adapter element. By means of this axial orientation of the connection portions and/or of the transfer portions, particularly good thermal decoupling of the friction element with respect to the adapter element can be achieved. Axial face surfaces are to be understood in particular to mean surfaces whose averaged normals have a maximum angle of 25°, but preferably of 5°, with respect to the axial direction. "Extend proceeding from a surface" means in particular that the connection portions or the transfer portions may be formed from said surface, for example by drilling, welding or casting. In other words, this may mean that the connection portions and/or the transfer portions may be a projection which points away from the axial face surface in an axial direction, such as for example a tooth or a recess. Said recess may be a hole which is round in certain regions, such as a slot, which advantageously extends in the radial direction, or a circular hole. Here, the connection portions together with the transfer portions expediently form a type of axial toothing with one another.

It is advantageous if at least one connection portion forms a radially inwardly open contour on the axial face surface of the friction element, and/or wherein at least one transfer portion forms a radially outwardly open contour on the axial face surface of the adapter element. Here, "open" means in particular that the connection portions or the transfer portions form, on a surface, a contour which is not of intrinsically closed form. In other words, this may mean that the contour extends as far as a border of the surface and ends there. By means of these open contours, it can be achieved that the friction element is displaceable relative to the adapter element in the radial direction, such that stresses owing to the thermally induced expansion of the components of the brake rotor are reduced. The contours expediently taper, such that these may form in particular a U shape or V shape. The flanks of the contours on the axial face surface of the adapter element may in this case form a first angle, and/or the contours on the axial face surface of the friction element may form a second angle, with respect to one another, which angles may lie between 90° and 10°. Particularly simple production of the transfer portions and/or of the connection portions is thus possible. The first angle and/or the second angle however preferably lie between 60° and 20°, whereby a particularly small structural space requirement of the connection portions and/or of the transfer portions can be realized. It is particular preferable, in order to realize high mechanical strength, if the first angle and/or the second angle lie between 50° and 35°. The first and the second angle are in this case in particular the averaged angles of two oppositely situated flanks of the contours. For example, in the case of a V shape of the contour, this is the opening angle of the V. For easy and inexpensive production, it is expedient if the first angle and the second angle are substantially equal. Here, "substantially equal" is to be understood in this context to mean that the two angles have a deviation of at most 5° with respect to one another.

It is preferable for intermediate elements to be arranged in or at the connection portions and/or in or at the transfer portions, wherein the intermediate elements each have a first transmission portion and a second transmission portion, wherein the first transmission portion is designed to transfer a torque about the axis of rotation to the friction element, and wherein the second transmission portion is designed to transfer a torque about the axis of rotation to the adapter element. The intermediate element is expediently a separate component in the torque transfer chain, which may however itself be of single-part or multi-part form. Through the use of the intermediate element, particularly good thermal decoupling of the adapter element from the friction element is realized. In this context, "arranged in or at" may be understood inter alia to mean that the connection portions and/or transfer portions surround the intermediate element at least in certain regions in a section plane, such that a reliable torque transfer can take place. Said section plane is in particular characterized by the fact that it may have a normal which is oriented parallel to the axial direction and thus to the axis of rotation. The torque transfer to the first transmission portion and/or to the second transmission portion preferably takes place in positively locking fashion, such that even highly dynamic torque fluctuations can be reliably transferred. If the connection portions and/or transfer portions are recesses, it is advantageous if these completely surround the intermediate element, such that a particularly reliable torque transfer can take place. For the intermediate element to perform its task, it is expedient if it is of rigid form. It is achieved in this way that the relative movements of the constituent parts of the brake rotor with respect to one another that occur owing to the unpreventable elastic deformations of the intermediate element are kept small. "Rigid" may be understood in particular to mean that the intermediate element has no notches, grooves, incisions or other weakenings which are designed to facilitate the deformation of the intermediate element. For a "rigid" design of the intermediate element, it is particularly expedient if the material of which the intermediate element is predominantly composed has a modulus of elasticity which has at most a deviation of 10% from the modulus of elasticity of the material of which the adapter element and/or the friction element is composed. The intermediate element is preferably arranged such that the intermediate element is arranged so as to be displaceable or movable in the axial direction relative to the adapter element and/or the friction element. In this way, the occurrence of thermally induced stress can be minimized or even prevented entirely.

The intermediate element is preferably oriented such that the main extent direction of the intermediate element points in the axial direction. The main extent direction is in particular the direction in which the length of the intermediate element is determined or in which possible openings, in particular installation openings, extend in the intermediate element. By means of this arrangement or orientation of the intermediate element, easy installability thereof is achieved. It is alternatively preferably possible for the intermediate element to be arranged such that the main extent direction of the intermediate element points in a radial direction. An advantage of this embodiment is that it results in a particularly small structural space requirement.

The first transmission portion of the intermediate element expediently substantially corresponds to the shape of the connection portion, and/or wherein the second transmission portion of the intermediate element substantially corresponds to the shape of the transfer portion. "Substantially corresponds" means inter alia that a basically similar geometrical shape is present. In particular, here, the contact-making surfaces, or contact surfaces, designed for the positively locking torque transfer are parallel to one another at least in certain regions. By means of this substantially corresponding shape—parallelism in certain regions—contact occurs such that there is only a low tendency for pitting to occur. In one embodiment, this may be achieved by virtue of the intermediate element being guided in positively locking fashion in the manner of a sliding block in the connection portion and/or in the transfer portion. Here, the connection portion and/or the transfer portion may expediently be slots which extend in particular in the radial direction or in the circumferential direction.

Preferably, the first transmission portion of the intermediate element and/or the second transmission portion of the intermediate element are/is surface-hardened. An intermediate element which exhibits particularly little wear is thus realized. It is alternatively preferable or additionally possible for the connection portions and/or the transfer portions to also be hardened, resulting in a particularly durable brake rotor. Here, the hardened surfaces advantageously have a hardness of 35 to 65, resulting in a brake rotor which exhibits particularly little wear. The hardened surfaces however preferably have a hardness of 40 to 55 HRC. The applicant has found that, with such a hardness, there is a particularly low tendency for cracks to form, in particular in the event of particularly intense fluctuations of the torque to be transferred.

The adapter element is expediently, in particular reversibly, clamped axially to the friction element by fastening means. The fastening means may for example be screws, bolts or rivets. "Reversibly" means in particular that a non-destructive release of the fastening means is possible. By means of the clamping, a preload in the axial direction can be induced which prevents the adapter element from being able to be displaced at least in the positive and/or negative axial direction. The fastening means are in this case expediently arranged in a circular manner about the axis of rotation. To realize a particularly easily installable connection, the fastening means preferably extend substantially in the axial direction. Here, in this context, "substantially" is to be understood to mean that the fastening means may have an angle of up to 5° with respect to the axial direction. It is alternatively preferably also possible for the fastening means to extend substantially in the radial direction, resulting in a small structural space requirement in the axial direction. The fastening means are expediently not designed to transfer the torque—or a part thereof—from the friction element to the adapter element. To be able to achieve this, the fastening elements may exhibit play in the circumferential direction and/or in the radial direction with respect to the adapter element and/or with respect to the friction element.

An elastic element is advantageously arranged between the fastening means and the adapter element and/or between the fastening means and the friction element. Through the use of this elastic element, it is possible to compensate in particular thermally induced deformations. The expression "between" may be understood in particular to mean that the elastic element is arranged in the force flow between the components. The elastic element itself may be formed in this case by a spring, in particular a plate spring. Alternatively or in addition, an elastic element may be arranged between the adapter element and the friction element, whereby the accessibility to the deflection space is reduced, such that the risk of pinching can be reduced. To realize easy installation, it may be expedient for elastic elements to be arranged around the fastening means. In other words, this may mean that the elastic elements are arranged similarly to washers around the fastening means.

The brake rotor preferably comprises at least one clamping ring, wherein the clamping ring is arranged between the fastening means and the adapter ring and/or wherein the clamping ring is arranged between the fastening means and the friction element, wherein the clamping ring is, at least in certain regions, rotationally symmetrical with respect to the axis of rotation. Through the use of the clamping ring, a particularly homogeneous and uniform distribution of the contact pressure can be made possible. In other words, the clamping ring can thus form a type of washer, wherein it is expediently the case that, for this purpose, the clamping ring surrounds the axis of rotation. In addition or alternatively, the clamping ring may also be formed as a pole wheel for an ABS sensor and/or as a clamping element. By means of this integral functionality of the clamping ring, components can be omitted, resulting in an inexpensive design of the brake rotor. The brake rotor may also have two identical or non-identical clamping rings, wherein the clamping rings are advantageously arranged at two mutually opposite surfaces. In other words, this may mean that the clamping rings are arranged at two distally opposite surfaces, such that one clamping ring prevents an axial displacement of the adapter element relative to the friction element in the positive axial direction and the other clamping ring prevents such a displacement in the negative axial direction.

According to the invention, a brake rotor, in particular one of the brake rotors stated above, comprises a pole wheel, wherein the pole wheel is composed of at least two elements which are formed from different materials. The pole wheel serves for determining the rotational speed, in particular about the axis of rotation, wherein this information is intended in particular for processing in an ABS system. In other words, said pole wheel may thus be a pole wheel for an ABS system. The elements of an ABS system that is possibly provided are to be regarded as a constituent part of the brake rotor if they can be set in rotation, in particular about the axis of rotation, by the brake rotor. The brake rotor may otherwise be formed for example by a brake disk, a brake drum or by one of the brake rotors described above. The two elements or components of the pole wheel which are composed of different materials are preferably elements of the pole wheel which do not serve for the fixing thereof to other elements of the brake rotor. The two elements are particularly preferably measurement components which are designed for generating, or at least making measurable, a measurement signal for the determination of the rotational speed. Different materials are to be understood in this context to mean materials which have different coefficients of thermal expansion. Owing to the different coefficients of thermal expansion, a relative heat-induced change in position of constituent parts of the two elements with respect to one another is achieved, wherein an indirect temperature measurement of the brake rotor is made possible by means of said change in position. The ratio of the lower coefficient of thermal expansion to the higher coefficient of thermal expansion particularly preferably lies in a range from 0.53 to 0.95. Particularly good detection of the temperature is made possible in this way. The ratio however particularly preferably lies in a range from 0.74 to 0.92, because it has been found that, in this range, a particularly good compromise between—thermally induced—loading and measurement signal definition is achieved.

In a preferred embodiment, the pole wheel has a first measurement ring and a secondary element, wherein the first measurement ring has a multiplicity of measurement openings and the secondary element has a multiplicity of measurement apertures, and wherein at least one measurement aperture is aligned with one measurement opening. The measurement ring and the secondary element are preferably the two elements of the pole wheel which are formed from different materials. The measurement ring may be designed as a continuous or discontinuous ring which may be of rotationally symmetrical design at least in certain regions with respect to an axis. This axis is in particular the axis about which the brake rotor is mounted so as to rotate or be rotatable. In other words, the axis is therefore the axis of rotation of the brake rotor. The secondary element may likewise be designed as a ring or alternatively as a ring segment or as a straight element. Here, in the measurement ring and the secondary element, there are provided a multiplicity of measurement openings or measurement apertures which serve for generating a measurement signal which permits a determination of the rotational speed of the pole wheel or of the brake rotor. This may be realized for example through utilization of the Hall effect or by ultrasound. The measurement openings and the measurement apertures may generally have any desired cross section, but the cross section is preferably a parallelogram, such that a measurement signal is generated which has a high level of signal definition. The secondary element is preferably in contact directly or indirectly with the measurement ring, in particular areally, wherein the thermally induced change in position—of at least some regions of the two elements—relative to one another, in particular in the circumferential direction, is as far as possible not impeded or even prevented. As a result of this areal, in particular direct, contact of the two elements, the heat transfer is increased, such that the two elements have an as far as possible identical temperature. In this context, surfaces come into contact areally in particular if, between two parallel surfaces which are of at least 15 mm² in size, there is a gap which is less than 0.75 mm. It is particularly preferable if the secondary element is arranged on a surface of the measurement ring which has a normal oriented substantially parallel to the axis of rotation or to the axial direction. In this way, it is achieved that the pole wheel has only a small structural space requirement in the direction of the axial direction. An alignment of the measurement aperture with the measurement opening is to be understood in this context to mean in particular that the projection of the cross section of the measurement opening and the projection of the cross section of the measurement aperture form a common overlap or intersection area, wherein the normal to the projection plane may be oriented substantially parallel to the axis of rotation. As a result of the alignment and as a result of the thermally induced relative change in position, the overlap/intersection area is a function of the temperature, such that, by means of the direct or indirect determination of said area, it is possible to infer the temperature of the brake rotor. Here, it is preferable if at least one measurement aperture is aligned with one measurement opening. It is however particularly preferable for the majority of, or all, measurement apertures to be aligned with in each case one measurement opening. "Substantially parallel to the axis of rotation" is to be understood to also mean arrangements at angles of +/−5°.

The pole wheel expediently has a multiplicity of secondary elements. As a result of the division of the secondary element into a multiplicity of segments, a decoupling of said segments with respect to one another is achieved, such that the expansion-induced mechanical loads are reduced. It is particularly preferable for each of said secondary elements to have a connection structure which mechanically couples the respective secondary element to the measurement ring. Said connection structure is particularly preferably formed as a projection or as an opening, in particular in the direction of the axial direction, which engages into a corresponding counterpart structure of the measurement ring. It is alternatively preferably possible for the connection structure to be fixed to the counterpart structure by installation means. The connection structure is in this case expediently arranged between a measurement aperture and an end of the secondary ring segment, in particular in the circumferential direction. It can be achieved in this way that a thermally induced relative change in position between the measurement ring and the secondary element is made possible in a particularly simple manner. The individual secondary elements (segments) may, but in this case need not imperatively, form a complete ring.

BRIEF DESCRIPTION OF THE DRAWINGS

Further advantages and features of the invention will emerge from the following description of preferred embodiments with reference to the appended figures, wherein individual features of different embodiments may be combined to form new embodiments. In the figures.

DETAILED DESCRIPTION OF THE PREFERRED EMBODIMENTS

Figure 1:
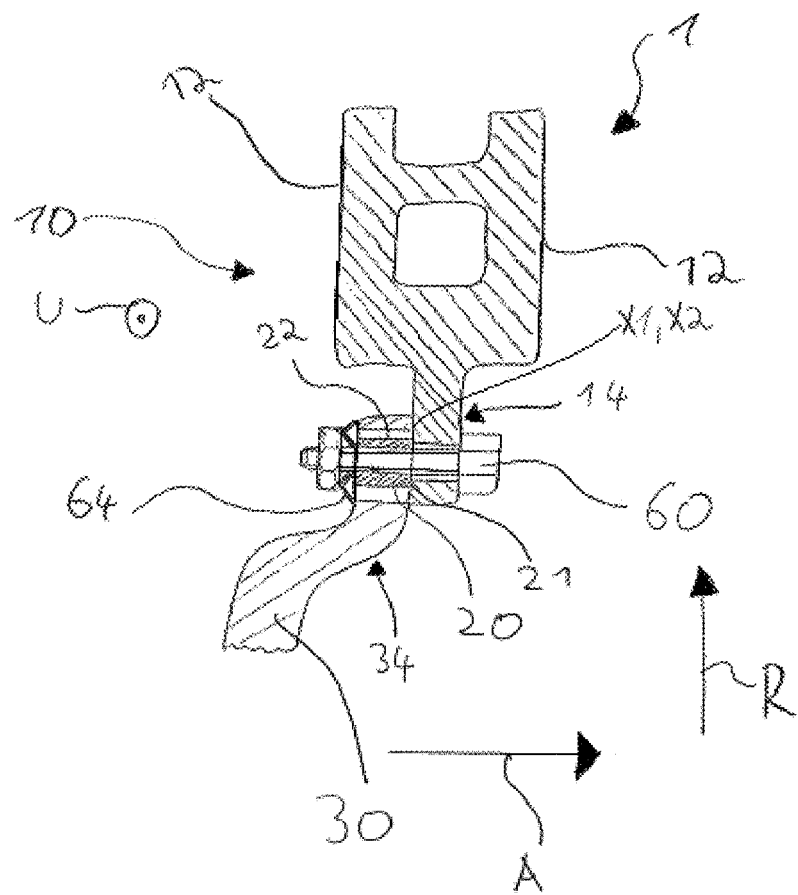
FIG. 1 shows a sectional illustration of an embodiment of a brake rotor.

FIG. 1 shows a brake rotor 1 which has a friction element 10 and an adapter element 30. The brake rotor 1 is designed to rotate about the axis of rotation A. The axis of rotation A, together with the radial direction R and the circumferential direction U, forms a cylindrical coordinate system, wherein the axial direction A forms the coordinate that is commonly referred to as vertical coordinate in the cylindrical coordinate system, the circumferential direction U forms the angular coordinate, and the radial direction R forms the radial coordinate. In the embodiment illustrated, the friction element 10 is an internally ventilated friction ring which has two friction surfaces 12 and, situated centrally between the two friction surfaces 12, a connection region 14, which extends radially inward proceeding from the friction surfaces 12. At an axial face surface X1 of the friction element 10, the friction element 10 makes contact with an axial face surface X2 of the adapter element 30. In the embodiment illustrated, the friction element 10 is clamped axially to the adapter element 30 by fastening means 60—in the form of a screw. In order to be able to compensate thermally induced expansions, an elastic element 64 is arranged between the fastening means 60 and the adapter element 30. In the embodiment illustrated, in order to transfer a torque in positively locking fashion about the axis of rotation A from the friction element 10 to the adapter element 30, an intermediate element 20 is arranged at the connection region 14 of the friction element 10, which intermediate element may in particular be welded to the friction element 10. Said intermediate element 20 in this case engages in positively locking fashion with the transfer region 34 of the adapter element 30 such that a torque about the axis of rotation A can be transferred in positively locking fashion. In order to be able to compensate thermally induced relative movements between the friction element 10 and the adapter element 20, the intermediate element 20 is guided with play in the radial direction R (so as to be theoretically displaceable in the radial direction) in the transfer region 34 of the adapter element 30.

Figure 2:
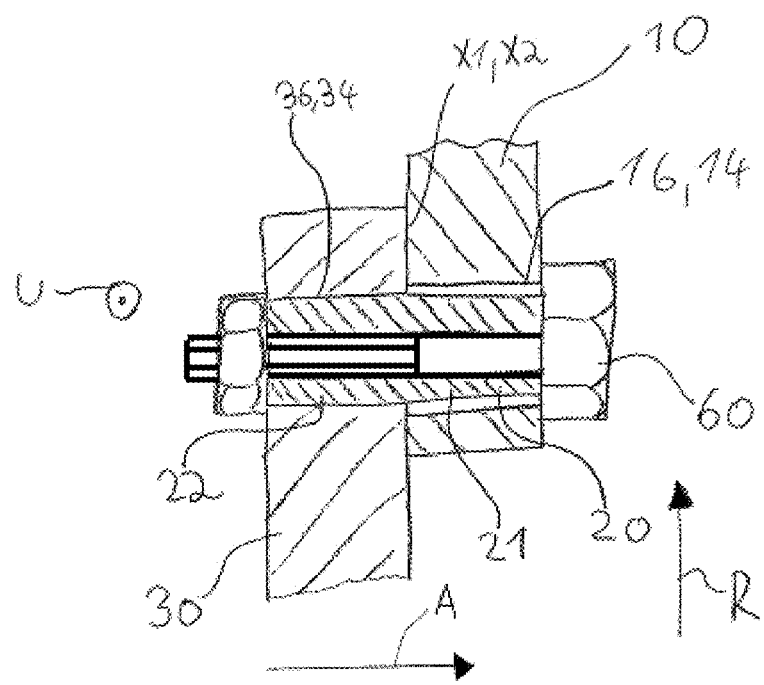
FIG. 2 shows a detailed view of the connection region and of the transfer region of a further embodiment of a brake rotor.

FIG. 2 shows a detail of an embodiment of a brake rotor 1 which is very similar to the embodiment illustrated in FIG. 1. The main difference here is that the connection element 20 is arranged with its second transmission portion 22 in the transfer portion 36 of the transfer region 34 of the adapter element 30. In the embodiment illustrated, the second transmission portion 22 is pressed into the adapter element 30. The embodiment illustrated likewise has fastening means 60, which clamp the friction element 10 to the adapter element 30 in the axial direction A. The first transmission portion 21 of the intermediate element 20 exhibits play in the radial direction R with respect to the connection portion 16 in the connection region 14 of the friction element 10, such that the connection portion 16 exhibits play with respect to the transfer portion 36. By contrast, in the circumferential direction U, the connection portion 16 makes contact with the first transmission portion 21 of the intermediate element 20 in order to transfer a torque about the axis of rotation A in positively locking fashion.

Figure 3:
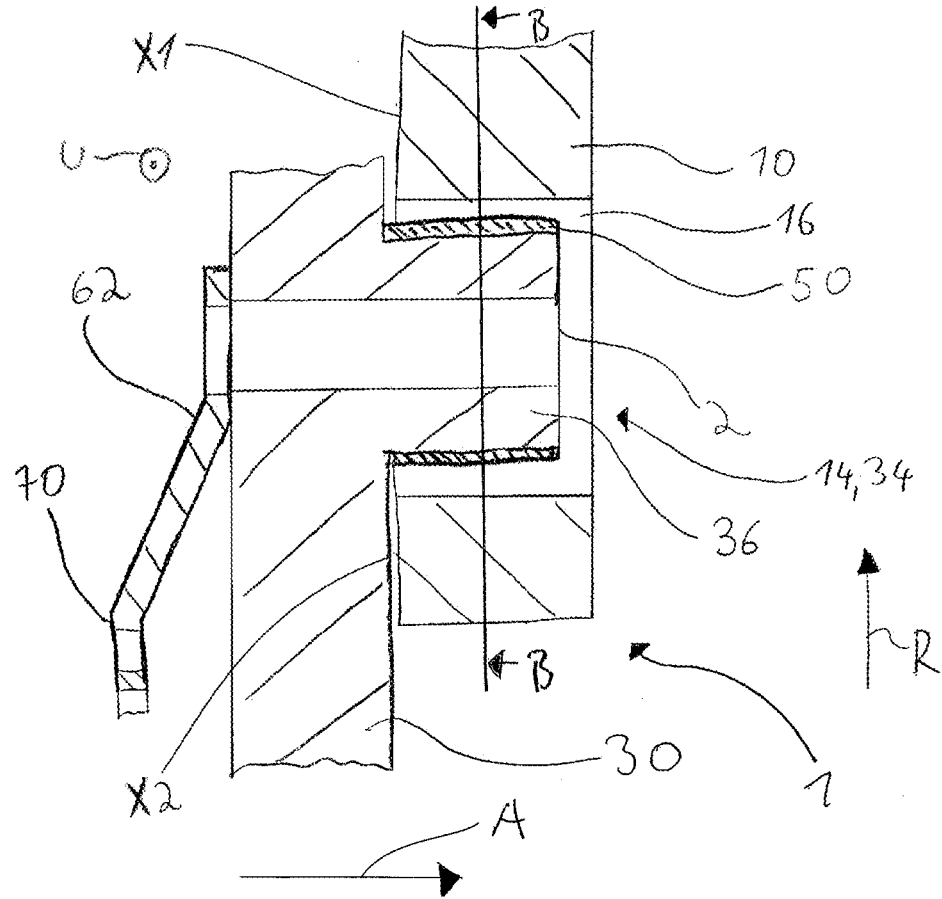
FIG. 3 shows a detailed view of the transfer region and of the connection region of a further embodiment of a brake rotor.

FIG. 3 illustrates a further embodiment of a brake rotor 1. In this embodiment, on the adapter element 30, there is arranged a clamping ring 62 which has a pole wheel portion 70, such that the clamping ring 62 functions as a pole wheel for an ABS sensor. Additionally, the clamping ring 62 in the illustrated embodiment also serves, together with fastening means 60 which are not illustrated, for forming a type of washer. For the positively locking torque transfer, the adapter element 30 has, in the transfer region 34, a transfer portion 36 which, in the embodiment illustrated, is formed as a separate protruding element. Said separate element is however formed as a single piece with the adapter element 30. The transfer portion 36 has an opening 2 which extends in the axial direction A and which extends all the way through the adapter element 30 and which is designed to receive fastening means 60 (not illustrated). Additionally, on the transfer portion 36, there is arranged a reinforcement element 50 which serves for realizing an as far as possible homogeneous contact pressure. The section through the connection region 14 as illustrated in FIG. 3 has a connection portion 16 which exhibits play in the radial direction R with respect to the reinforcement element 50 and with respect to the transfer portion 36. In the circumferential direction U, however, the connection portion 16 makes contact with the reinforcement element 50, in order to transfer a torque about the axis of rotation A in positively locking fashion.

Figure 4:
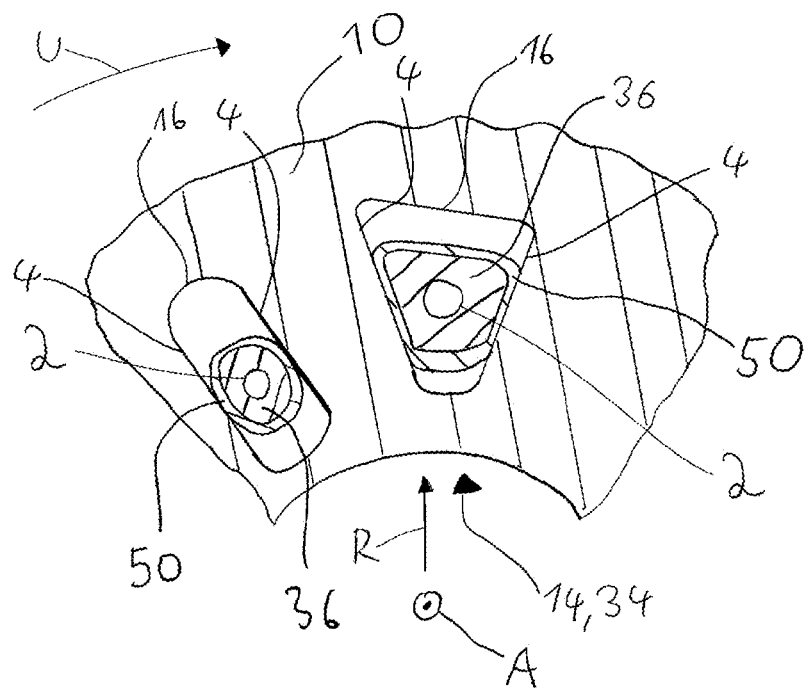
FIG. 4 shows a section from B to B in FIG. 3.

FIG. 4 illustrates the section from B to B from FIG. 3. FIG. 4 shows two alternative designs of the connection region 14 of the friction element 10 and of the transfer portion 36. In the left-hand embodiment, the connection portion 16 is formed by a slot which extends outward in the radial direction R away from the axis of rotation A. Here, the contact surfaces 4 of the connection portion 16 extend parallel to one another. The transfer portion 36, which in the section plane illustrated is completely surrounded by a reinforcement element 50, is seated in the manner of a sliding block in the connection portion 16 of the friction element 10. In the alternative embodiment of the connection portion 16 illustrated on the right, the two contact surfaces 4 of the connection portion 16 are formed at an angle with respect to one another, such that said two contact surfaces 4 are arranged in a V shape with respect to one another. The angular bisector of said angle points in the radial direction R. In the embodiment illustrated, the complementary transfer portion 36 of the transfer region 34 has—with the aid of the reinforcement element 50—a shape substantially corresponding to the connection portion 16. In this embodiment of the transfer portion 36, too, the reinforcement element 50 completely surrounds the transfer portion 36 in the section plane illustrated. It is alternatively preferably possible for the transfer portion 36 to also be formed by intermediate elements 20, such that the section illustrated in FIG. 4 could also apply to the embodiments of FIG. 2 or of FIG. 1.

Figure 5:
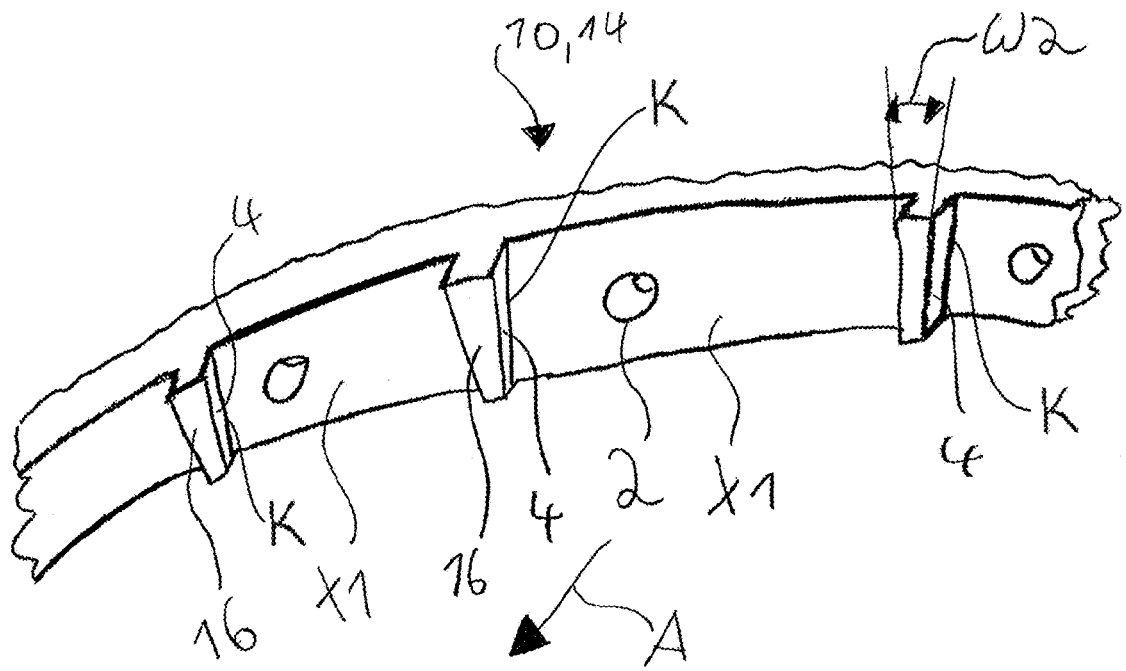
FIG. 5 shows a detail of a connection region of a friction element.

The detail of a friction element 10 as illustrated in FIG. 5 shows primarily the connection region 14 of the friction element 10. In the embodiment illustrated, the connection portions 16 are formed by projections pointing in the axial direction A away from the axial section surface of the friction element X1. Here, the connection portions 16 formed by the projections generate contours K on the axial face surface X1 of the friction element 10, which contours are both radially inwardly and radially outwardly open. The flanks of the contour K form a second angle W2 with respect to one another. The connection portions 16 have in each case two contact surfaces 4, wherein only in each case one of the contact surfaces 4 of the connection portion 16 can be seen from the perspective view in FIG. 5.

Figure 6:
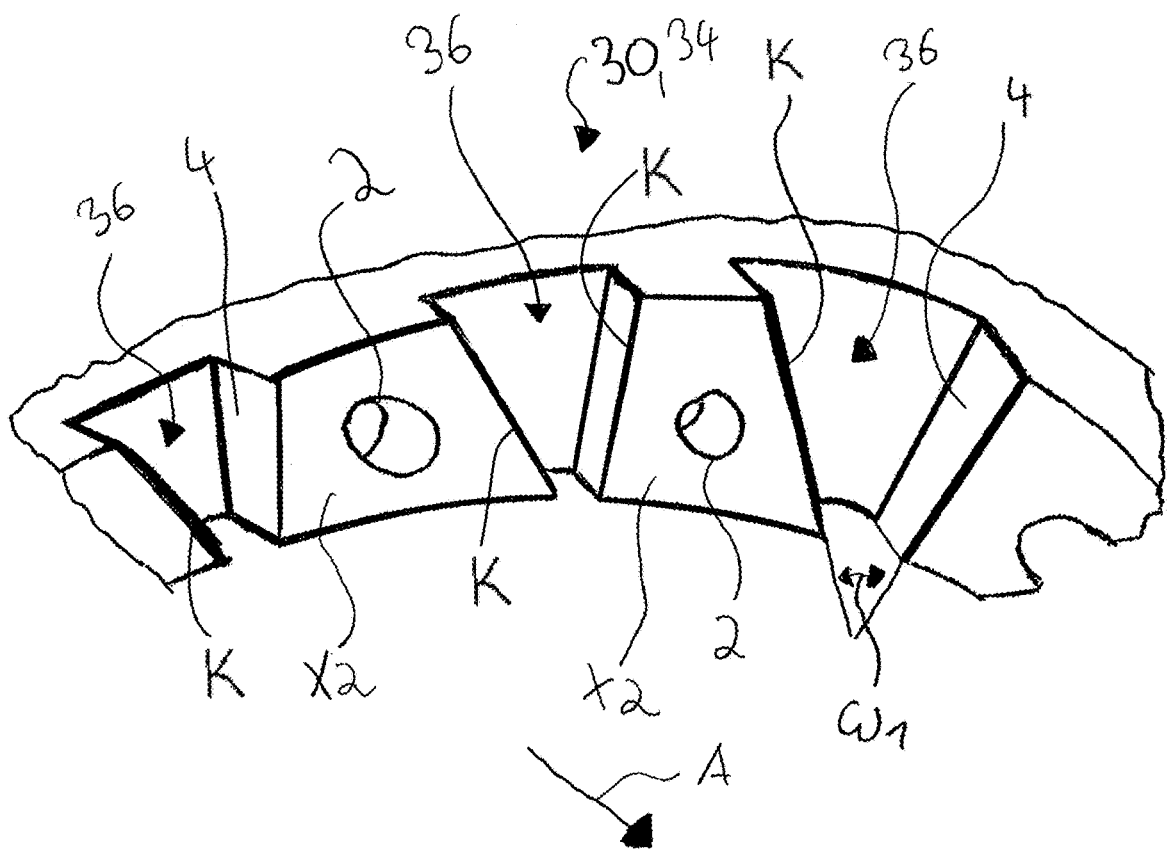
FIG. 6 shows a detail of a transfer region of an adapter element.

FIG. 6 illustrates a detail of the transfer region 34 of the adapter element 30. In the embodiment illustrated, the transfer portions 36 are formed by recesses which extend in the axial direction A proceeding from the axial face surface X2 of the adapter element 30. Said recess forms inter alia the contour K on the axial face surface X2 of the adapter element 30, which contour is inwardly and outwardly open. For a positively locking torque transfer, the transfer portions 36 each have two contact surfaces 4. For the axial clamping of the adapter element 30, the axial face surface of the adapter element X2 has openings 2 which are designed to receive fastening means 60 (not illustrated).

Figure 7:
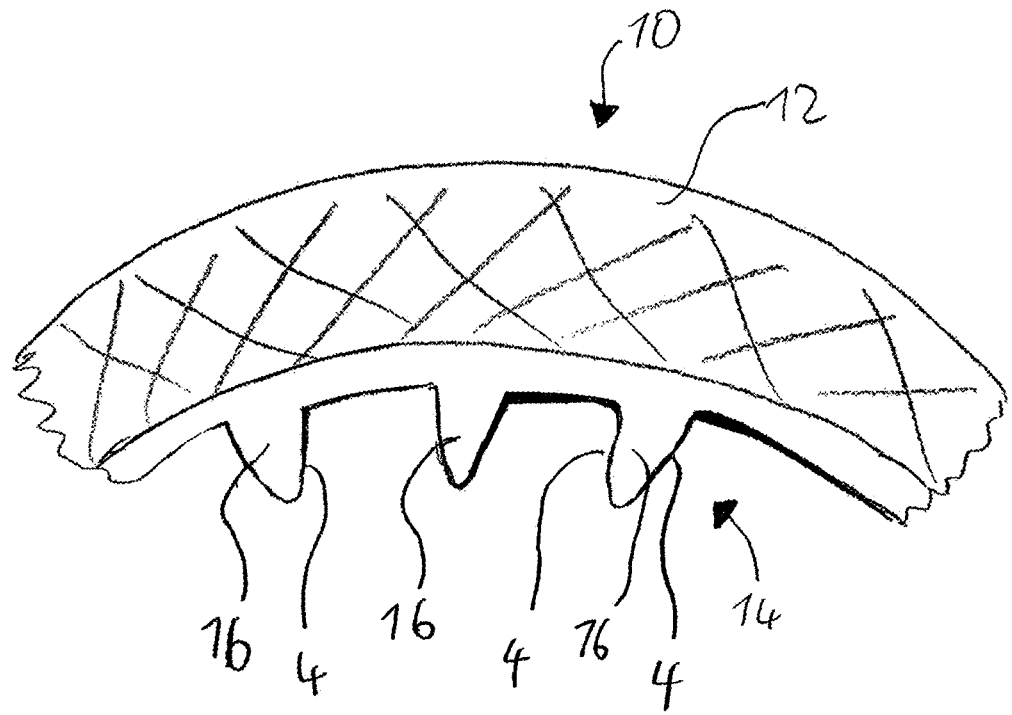
FIG. 7 shows a detail of an embodiment of a friction element.

FIG. 7 illustrates an embodiment of a friction element 10 which has, inter alia, a friction surface 12 and a radially inwardly extending connection region 14. The connection region 14 comprises connection portions 16 in the form of radially inwardly pointing teeth. Said connection portions 16 each have two contact surfaces 4 for the torque transfer.

Figure 8:
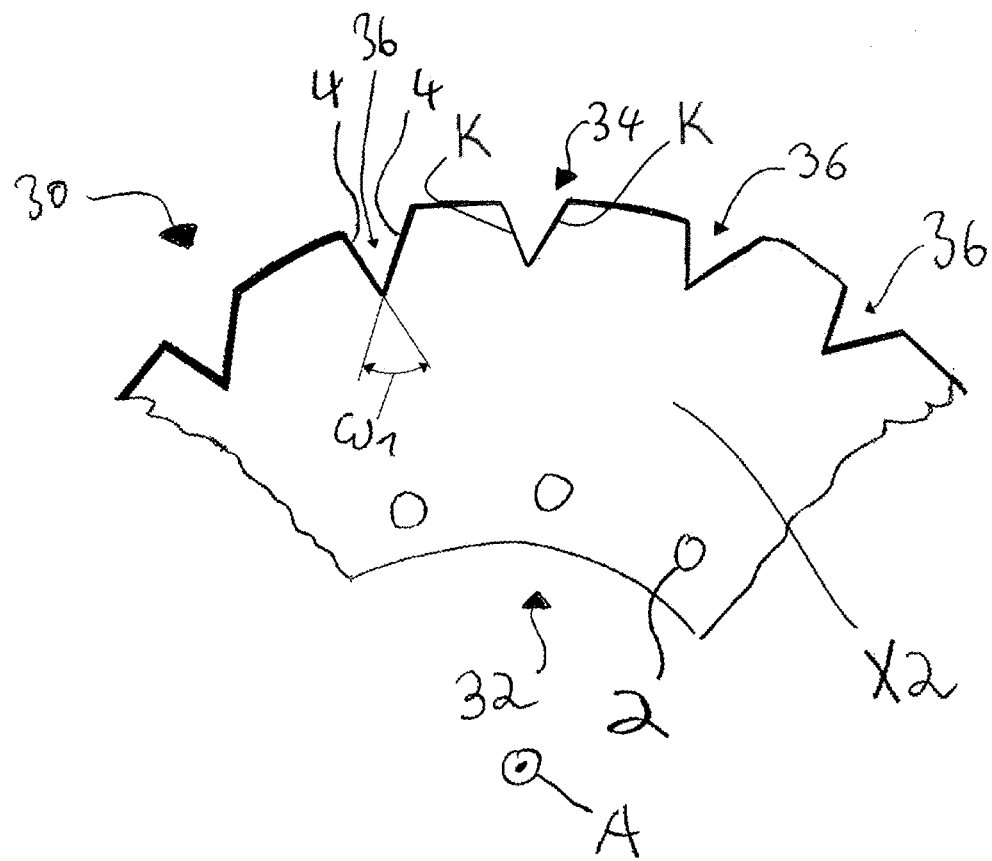
FIG. 8 shows a detail of an embodiment of an adapter element.

FIG. 8 shows a detail of an embodiment of an adapter element 30. The adapter element 30 has a radially inwardly pointing installation region 32 which has openings 2 for fixing to a hub. Situated at the radially opposite end of the adapter element 30 is the transfer region 34. Said transfer region 34 has a multiplicity of transfer portions 36—in the form of V-shaped recesses. In the embodiment illustrated, the contact surfaces 4 which are formed by the recesses and which extend in the axial direction A from one distal end to the other distal end of the transfer region 34 form outwardly open contours K on the axial face surface of the adapter element X2. Here, the flanks of the contour K have a first angle W1 with respect to one another.

Figure 9:
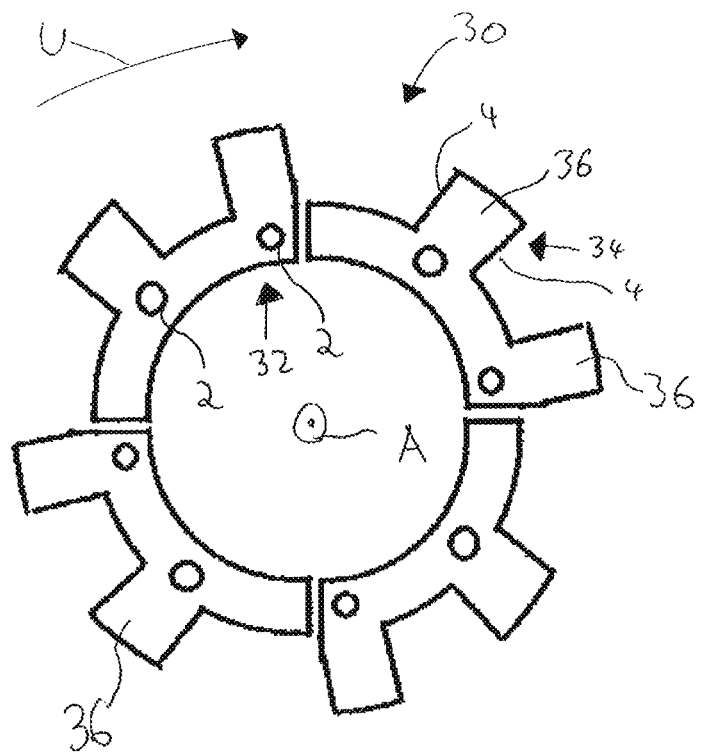
FIG. 9 shows a multi-part embodiment of an adapter element.

FIG. 9 illustrates a multi-part embodiment of an adapter element 30. In this embodiment, the adapter element 30 comprises four elements in the circumferential direction U. Each individual one of said elements has a part of the installation region 32, wherein said constituent parts of the installation region 32 each comprise two openings 2. Additionally, the elements each have two transfer portions 36 which extend radially outward and form a type of radially outwardly pointing toothing. The transfer portions 36 of the transfer region 34 each have two contact surfaces 4 which are oriented parallel to one another.

Figure 10:
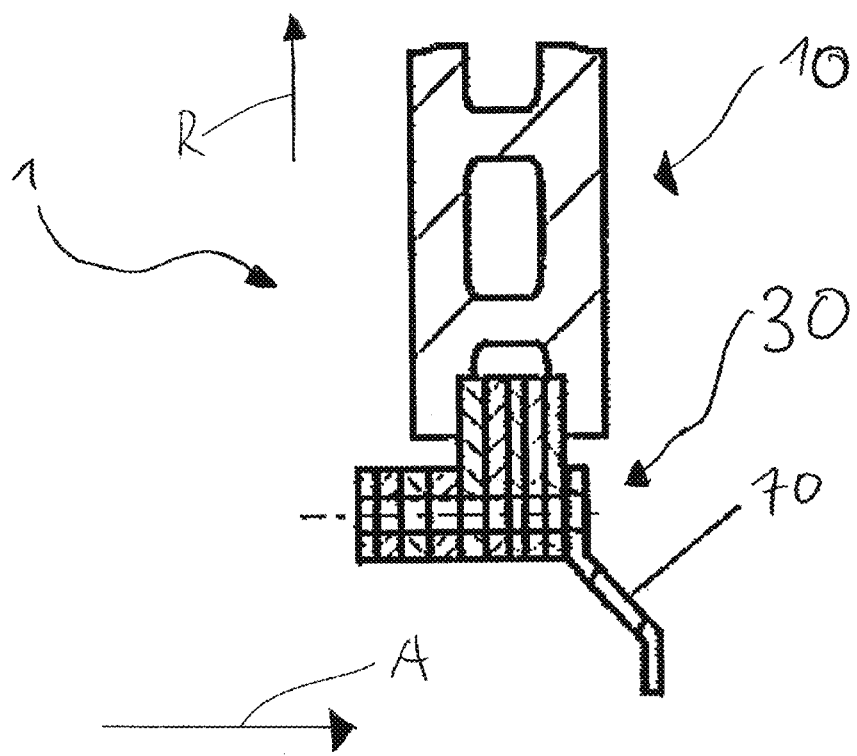
FIG. 10 shows a further embodiment of a multi-part brake rotor.

FIG. 10 illustrates a further embodiment of a brake rotor 1, in the case of which the friction element 10 is formed by an internally ventilated friction ring. The adapter element 30 is constructed from multiple elements in the axial direction A. The pole wheel 70—for an ABS sensor—is likewise formed by a layer of the adapter element 30. Each individual one of said layers in the axial direction A may be offset with respect to one another in the circumferential direction such that said individual layers are secured in positively locking fashion relative to one another in the axial direction A. In other words, the individual layers may be arranged relative to one another in the axial direction A in the manner of an offset group of bricks in a wall.

Figure 11:
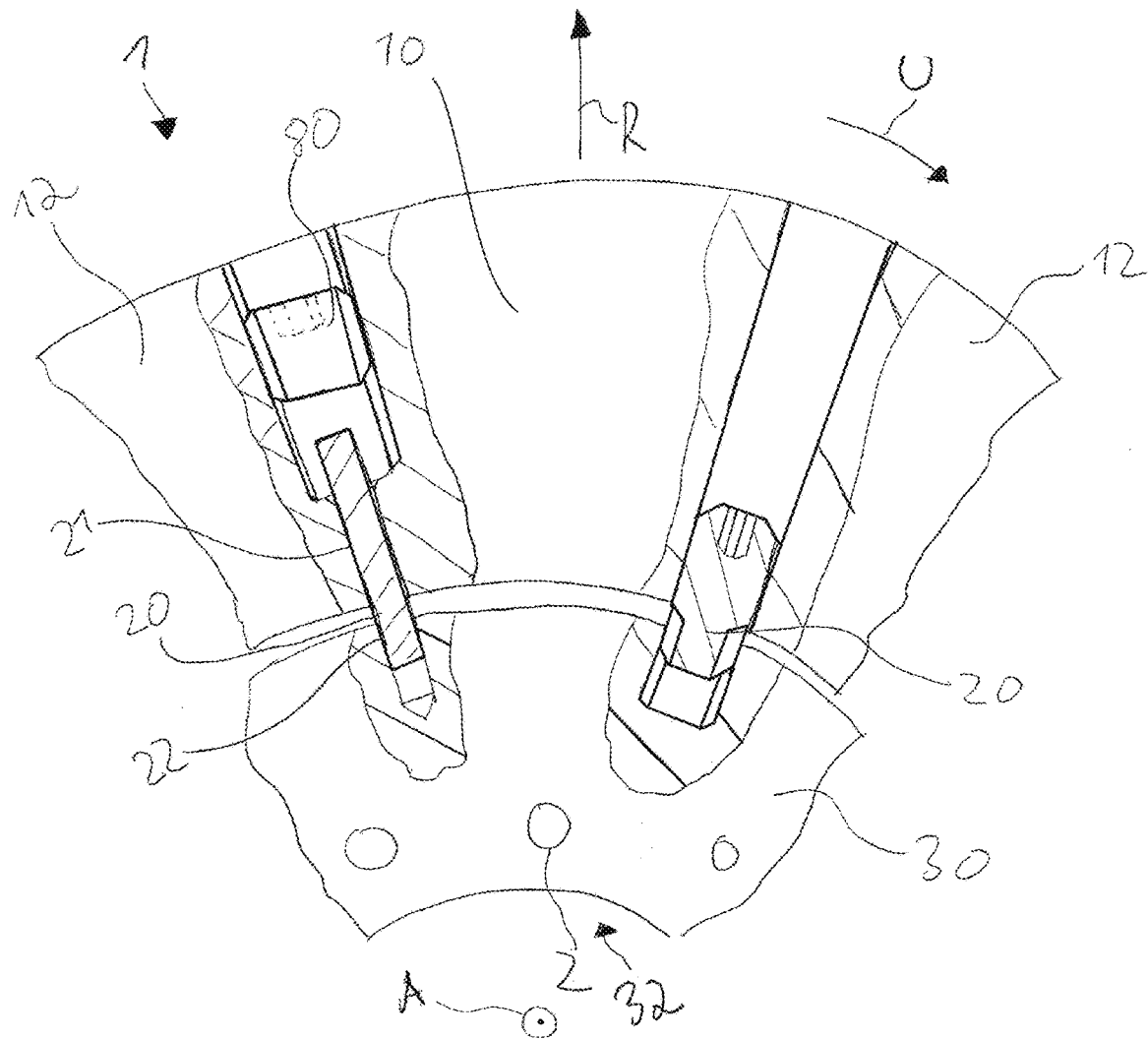
FIG. 11 shows a detail of a preferred embodiment of a brake rotor.

FIG. 11 illustrates a detail of a brake rotor 1 in the case of which the intermediate elements 20 extend in the radial direction R. Here, the intermediate elements 20 are introduced radially from the outside into the friction element 10, wherein the friction element 10 has a first friction surface 12 and an oppositely situated second friction surface 12 (not illustrated). The illustration in FIG. 11 shows two different embodiments for the arrangement of intermediate elements 20, which may however be combined with one another in one brake rotor 1. In the case of the left-hand embodiment, the intermediate element 20 is characterized by a bolt-like structure, wherein the first transmission portion 21 of the intermediate element 20 comes into contact in positively locking fashion with the friction element 10 such that a torque about the axial direction A can be transferred to the adapter element 30 by the intermediate element 20. For this purpose, the intermediate element 20 has a second transmission portion 22, which engages in positively locking fashion into the adapter element 30. To prevent an escape of the intermediate element 20, a securing element 80 is arranged in the friction element 10, which securing element is itself in turn secured by a self-locking thread. In the right-hand embodiment in FIG. 11, the intermediate element 20 is formed by a bolt which has a thread, which is screwed into a thread in the adapter element 30. Said intermediate element 20 is in this case in positively locking contact with the friction element 10 such that a torque about the axis of rotation A can be transferred. For installation on a hub (not illustrated), the installation region 32 of the adapter element 30 has openings 2.

Figure 12:
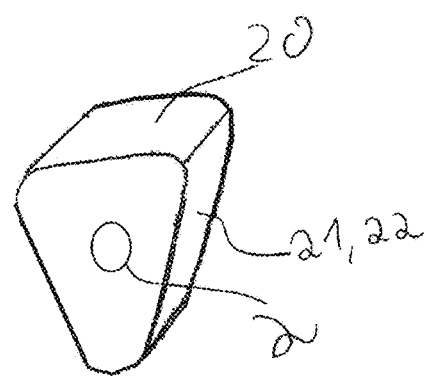
FIG. 12 shows an embodiment of an intermediate element.

FIG. 12 shows an intermediate element 20 which has an opening 2 for the purposes of installation and comprises a first transmission portion 21 and a second transmission portion 22. Here, the first transmission portion 21 and the second transmission portion 22 have surfaces which can serve for engaging in positively locking fashion with a connection portion 16 (not illustrated) and the contact surfaces 4 thereof and/or with a transfer portion 36 and the contact surfaces 4 thereof such that a torque can be transferred.

Figure 13:
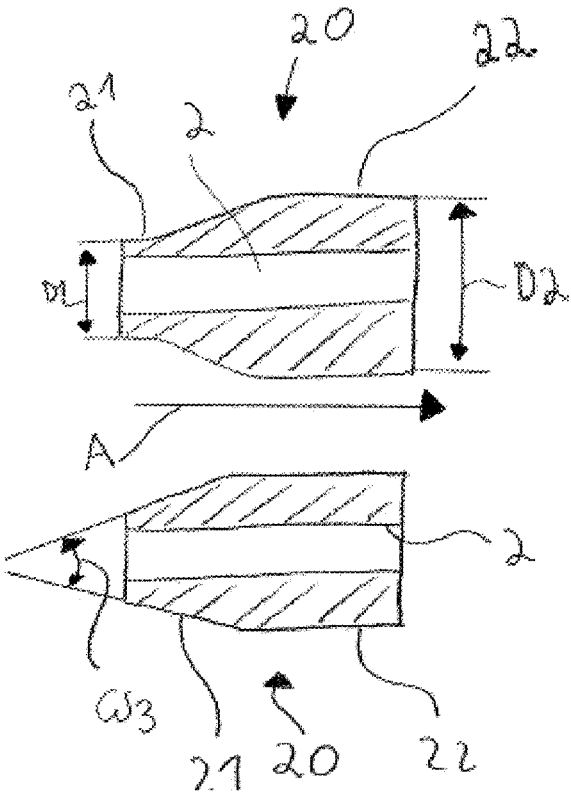
FIG. 13 shows two sectional views of different embodiments of intermediate elements.

FIG. 13 illustrates two different embodiments of intermediate elements 20. Both intermediate elements 20 have a first transmission portion 21 and a second transmission portion 22. Here, the first transmission portion 21 of the upper embodiment has a first averaged contact spacing D1 which is smaller than the second averaged contact spacing D2. The averaged contact spacings (D1, D2) are the averaged spacings of oppositely situated surfaces of the first and of the second transmission portion (21, 22) respectively, wherein said surfaces may be designed to be placed in positively locking engagement with the friction element 10 and/or the adapter element 30. Here, the lower embodiment of the intermediate element 20 differs from the upper embodiment in that the contact surfaces of the first transmission portion 21 form a third angle with respect to one another, such that the intermediate element 20 can be mounted with centering action in a connection portion 16. Additionally, both of the illustrated embodiments of intermediate elements 20 have openings 2 for installation purposes.

Figure 14:
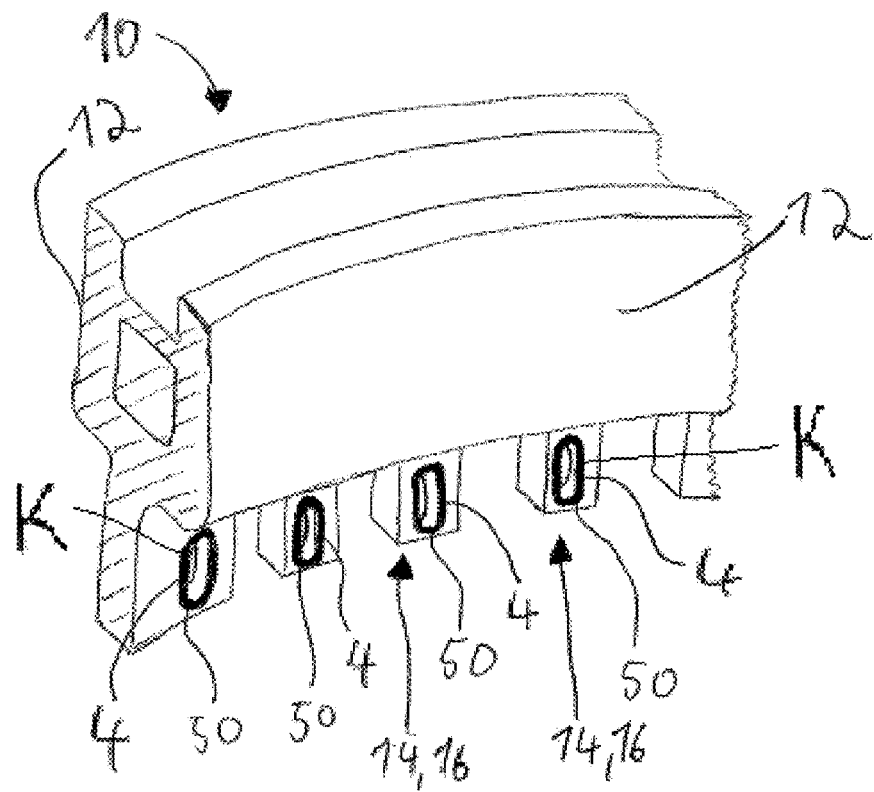
FIG. 14 shows a detailed view of a detail of a friction element.

FIG. 14 illustrates a partial segment of a friction element 10, wherein said friction element 10 has two oppositely situated friction surfaces 12 and multiple radially inwardly pointing connection regions 14. The connection regions 14 each comprise a connection portion 16. Said connection portions 16 are in this case slots, which form a contour K on the connection regions 14. In the connection portions 16, there is arranged in each case one reinforcement element 50 which is composed in particular of high-grade steel. The contact surfaces 4 of the connection portion 16 or of the reinforcement element 50 serve for engaging in positively locking fashion with an adapter element 30 (not illustrated) such that a torque can be transmitted. The slots that form the connection portions 16 extend radially outward. This embodiment is advantageous because, here, intermediate elements 20 or transfer portions 36 can engage in a particularly simple and inexpensive manner, in the manner of a sliding block, into the connection portions 16.

Figure 15:
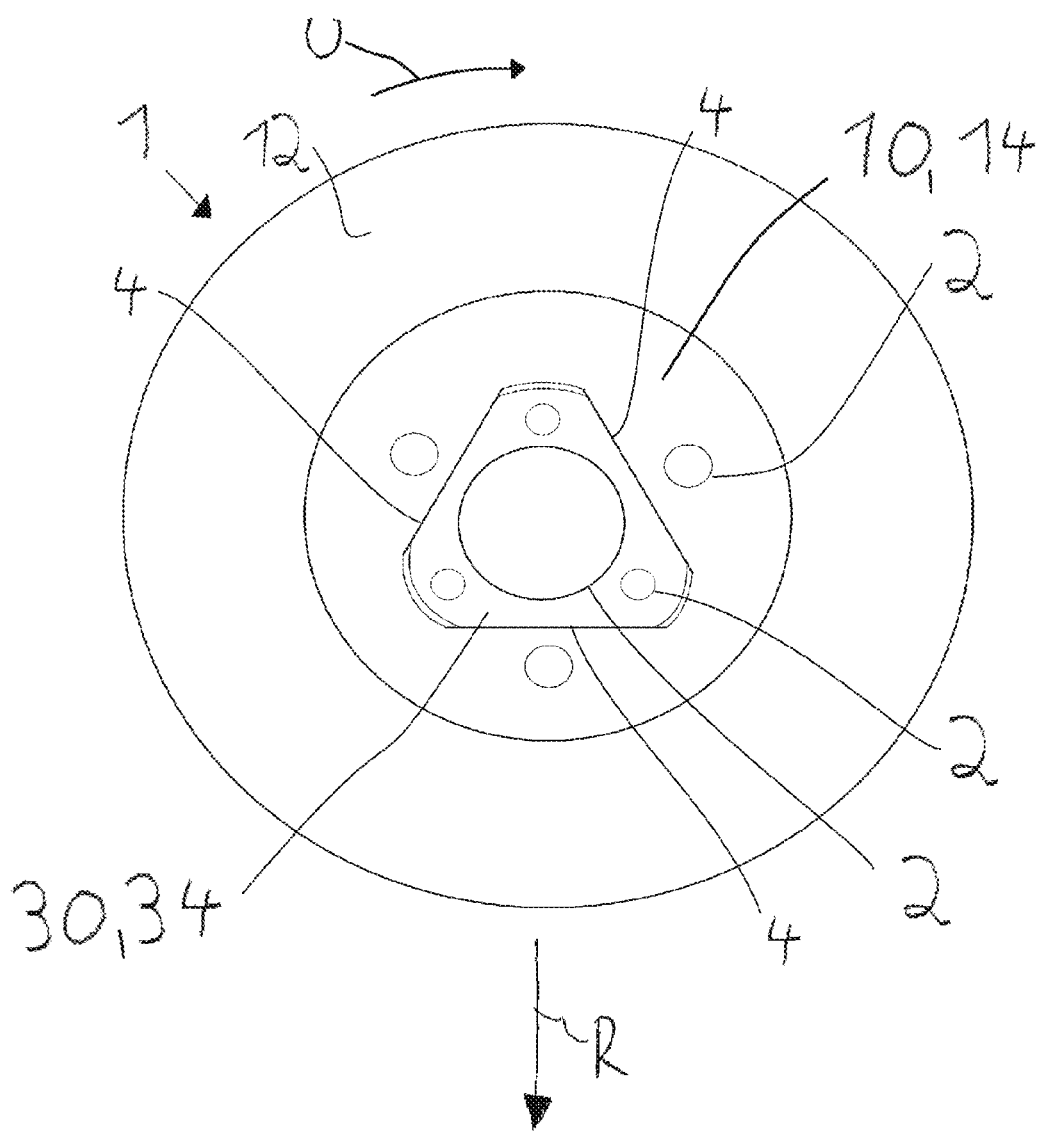
FIG. 15 shows a further embodiment of a brake rotor.

FIG. 15 illustrates a further embodiment of a brake rotor 1, wherein the brake rotor 1 comprises a friction element 10 and an adapter element 30. Here, the friction element 10 has two oppositely situated friction surfaces 12 (only one of which can be seen in FIG. 15) which extend radially outward. Radially to the inside, the friction element 10 has, in the connection region 14, three contact surfaces 4 which form a type of polygonal connection with substantially corresponding contact surfaces 4 of the adapter element 30. In order to be able to be fixed to a hub, the adapter element 30 has openings 2. By contrast, the openings 2 of the friction element 10 serve in particular for preventing, by means of clamping rings 62 which are not illustrated, an axial displacement of the friction element 10 relative to the adapter element 30.

Figure 16:
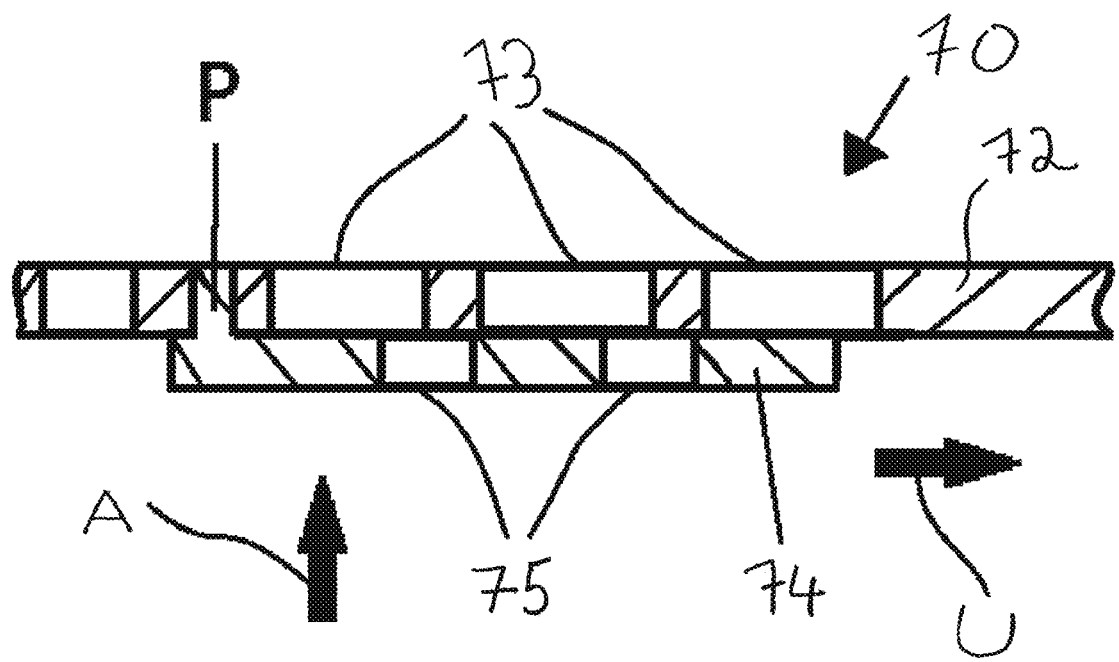
FIG. 16 shows an embodiment of a pole wheel.

FIG. 16 shows a detail from a section through an embodiment of a pole wheel 70 according to the invention of the brake rotor 1. The pole wheel 70 comprises a measurement ring 72 and a multiplicity of secondary elements 74, wherein only one of said secondary elements 74 can be seen in FIG. 16. Each of said secondary elements 74 has, at one end in the circumferential direction U, a connection structure P which serves for the fixing of the secondary element 74 to the measurement ring 72. The measurement ring 72 has a multiplicity of measurement openings 73 which extend in the direction of the axial direction A or of the axis of rotation A, and wherein the measurement apertures 75 of the secondary element 74 are aligned with the measurement openings 73.

LIST OF REFERENCE DESIGNATIONS

1—Brake rotor
2—Opening
4—Contact surface
10—Friction element
12—Friction surface
14—Connection region
16—Connection portion
20—Intermediate element
21—First transmission portion
22—Second transmission portion
30—Adapter element
32—Installation region 34—Transfer region
36—Transmission portion
50—Reinforcement element
60—Fastening means
62—Clamping ring
64—Elastic element
70—Pole wheel
72—Measurement ring
73—Measurement opening
74—Secondary element
75—Measurement aperture
80—Securing element
A—Axial direction/axis of rotation
B—Section plane
D1—First averaged contact spacing
D2—Second averaged contact spacing
K—Contour
P—Connecting structure
R—Radial direction
U—Circumferential direction
W1—First angle
W2—Second angle
W3—Third angle
X1—Axial face surface of the friction element
X2—Axial face surface of the adapter element

The invention claimed is:

1. A brake rotor for utility vehicles, comprising:
at least one friction element; and
an adapter element;
wherein the brake rotor is configured to rotate about an axis of rotation;
wherein the friction element has at least one friction surface and a connection region;
wherein the adapter element has an installation region and a transfer region;
wherein the installation region is configured to fix the brake rotor to a hub;
wherein the connection region indirectly or directly engages in positively locking fashion in a circumferential direction with the transfer region such that a torque about the axis of rotation can be transferred between the connection region and the transfer region from the friction element to the adapter element; and
wherein the adapter element is of multi-part form in the circumferential direction.

2. The brake rotor as claimed in claim 1, wherein the connection region includes at least three connection portions, and wherein the transfer region includes at least three complementary transfer portions.

3. The brake rotor as claimed in claim 2, wherein each of the connection portions exhibit play in a radial direction in relation to a respective one of complementary transfer portions.

4. The brake rotor as claimed in claim 3, wherein the connection portions extend in the axial direction proceeding from an axial face surface of the friction element, and/or wherein the transfer portions extend in the axial direction proceeding from an axial face surface of the adapter element.

5. The brake rotor as claimed in claim 4, wherein reinforcement elements are arranged on the connection portions and/or the transfer portions.

6. The brake rotor as claimed in claim 5, wherein at least one of the connection portions forms a radially inwardly open contour on the axial face surface of the friction element, and/or wherein at least one of the transfer portions forms a radially outwardly open contour on the axial face surface of the adapter element.

7. The brake rotor as claimed in claim 1, wherein the connection region includes at least one connection portion, and wherein the transfer region includes at least one complementary transfer portions.

8. The brake rotor as claimed in claim 7, wherein the at least one connection portion exhibits play in a radial direction in relation to the at least one complementary transfer portion.

9. The brake rotor as claimed in claim 7, wherein the at least one connection portion extends in the axial direction proceeding from an axial face surface of the friction element, and/or wherein the at least one transfer portion extends in the axial direction proceeding from an axial face surface of the adapter element.

10. The brake rotor as claimed in claim 7, wherein at least one reinforcement element is arranged on the at least one connection portion and/or the at least one transfer portion.

11. The brake rotor as claimed in claim 7, wherein the at least one of the connection portion forms a radially inwardly open contour on the axial face surface of the friction element, and/or wherein the at least one of the transfer portion forms a radially outwardly open contour on the axial face surface of the adapter element.

12. The brake rotor as claimed in claim 1, wherein the adapter element is reversibly clamped axially to the friction element by a fastener.

13. The brake rotor as claimed in claim 12, further comprising:
at least one clamping ring;
wherein the at least one clamping ring is arranged between the fastener and the adapter element and/or wherein the at least one clamping ring is arranged between the fastener and the friction element; and
wherein the at least one clamping ring is, at least in certain regions, rotationally symmetrical with respect to the axis of rotation.

14. The brake rotor as claimed in claim 1, where the adapter is of multi-part form in the axial direction.

15. A brake rotor for utility vehicles, comprising:
at least one friction element; and
an adapter element;
wherein the brake rotor is configured to rotate about an axis of rotation;
wherein the friction element has at least one friction surface and a connection region;
wherein the adapter element has an installation region and a transfer region;
wherein the installation region is configured to fix the brake rotor to a hub;
wherein the connection region indirectly or directly engages in positively locking fashion in a circumferential direction with the transfer region such that a torque about the axis of rotation can be transferred between the connection region and the transfer region from the friction element to the adapter element;
wherein the adapter element is of multi-part form in the axial direction or in the circumferential direction;
wherein the connection portions extend in the axial direction proceeding from an axial face surface of the friction element, and/or wherein the transfer portions extend in the axial direction proceeding from an axial face surface of the adapter element;
wherein reinforcement elements are arranged on the connection portions and/or the transfer portions;

wherein at least one of the connection portions forms a radially inwardly open contour on the axial face surface of the friction element, and/or wherein at least one of the transfer portions forms a radially outwardly open contour on the axial face surface of the adapter element; and wherein intermediate elements are arranged at the connection portions and/or at the transfer portions, the intermediate elements each have a first transmission portion and a second transmission portion, the first transmission portion is configured to transfer a torque about the axis of rotation to the friction element, and wherein the second transmission portion is configured to transfer a torque about the axis of rotation to the adapter element.

16. The brake rotor as claimed in claim 15, wherein the intermediate element is oriented such that a main extent direction of the intermediate element points in the axial direction.

17. The brake rotor as claimed in claim 16, wherein the first transmission portion of the intermediate element substantially corresponds to the shape of the connection portion, and/or wherein the second transmission portion of the intermediate element substantially corresponds to the shape of the transfer portion.

18. The brake rotor as claimed in claim 17, wherein the first transmission portion of the intermediate element and/or the second transmission portion of the intermediate element are surface-hardened.

19. The brake rotor as claimed in claim 18, wherein the adapter element is reversibly clamped axially to the friction element by a fastener.

20. The brake rotor as claimed in claim 19, further comprising:
at least one clamping ring;
wherein the at least one clamping ring is arranged between the fastener and the adapter element, and/or wherein the at least one clamping ring is arranged between the fastener and the friction element; and
wherein the at least one clamping ring is, at least in certain regions, rotationally symmetrical with respect to the axis of rotation.

21. The brake rotor as claimed in claim 20, further comprising:
a pole wheel that includes at least two elements which comprise different materials from one another.

22. The brake rotor as claimed in claim 21, wherein a ratio of a lower coefficient of thermal expansion to a higher coefficient of thermal expansion of the different materials lies in a range from 0.53 to 0.95.

23. A brake rotor for utility vehicles, comprising:
at least one friction element; and
an adapter element;
wherein the brake rotor is configured to rotate about an axis of rotation;
wherein the friction element has at least one friction surface and a connection region;
wherein the adapter element has an installation region and a transfer region;
wherein the installation region is configured to fix the brake rotor to a hub;
wherein the connection region indirectly or directly engages in positively locking fashion in a circumferential direction with the transfer region such that a torque about the axis of rotation can be transferred between the connection region and the transfer region from the friction element to the adapter element;
wherein the adapter element is of multi-part form in the axial direction or in the circumferential direction;
wherein the connection regions includes at least one connection portion, and wherein the transfer region includes at least one complementary transfer portions; and
wherein the connection region includes at least one connection portion, and wherein the transfer region includes at least one complementary transfer portions; and
wherein at least one intermediate element is arranged at the at least one connection portions and/or at the at least one transfer portions, the at least one intermediate elements includes a first transmission portion and a second transmission portion, the first transmission portion is configured to transfer a torque about the axis of rotation to the friction element, and wherein the second transmission portion is configured to transfer a torque about the axis of rotation to the adapter element.

24. The brake rotor as claimed in claim 23, wherein the at least one intermediate element is oriented such that a main extent direction of the at least one intermediate element points in the axial direction.

25. The brake rotor as claimed in claim 23, wherein the first transmission portion of the at least one intermediate element substantially corresponds to the shape of the connection portion, and/or wherein the second transmission portion of the at least one intermediate element substantially corresponds to the shape of the transfer portion.

26. A brake rotor for utility vehicles, comprising:
at least one friction element; and
an adapter element;
wherein the brake rotor is configured to rotate about an axis of rotation;
wherein the friction element has at least one friction surface and a connection region;
wherein the adapter element has an installation region and a transfer region;
wherein the installation region is configured to fix the brake rotor to a hub;
wherein the connection region indirectly or directly engages in positively locking fashion in a circumferential direction with the transfer region such that a torque about the axis of rotation can be transferred between the connection region and the transfer region from the friction element to the adapter element;
wherein the adapter element is of multi-part form in the axial direction or in the circumferential direction; and further comprising
a pole wheel that includes at least two elements which comprise different materials from one another.

27. The brake rotor as claimed in claim 26, wherein a ratio of a lower coefficient of thermal expansion to a higher coefficient of thermal expansion of the different materials lies in a range from 0.53 to 0.95.

* * * * *

UNITED STATES PATENT AND TRADEMARK OFFICE
CERTIFICATE OF CORRECTION

| | |
|---|---|
| PATENT NO. | : 11,519,472 B2 |
| APPLICATION NO. | : 16/645713 |
| DATED | : December 6, 2022 |
| INVENTOR(S) | : Elmar et al. |

It is certified that error appears in the above-identified patent and that said Letters Patent is hereby corrected as shown below:

In the Specification

Column 5, Line 29:
"particular" should be — particularly —

In the Claims

Column 16, Claim 7, Line 6:
"portions" should be — portion —

Column 17, Claim 18, Line 29:
"are" should be — is/are —

Column 18, Claim 23, Line 9:
"regions" should be — region —

Column 18, Claim 23, Lines 11, 18, 19:
"portions" should be — portion —

Column 18, Claim 23, Lines 13-16:
Delete "wherein the connection region includes at least one connection portion, and wherein the transfer region includes at least one complementary transfer portions; and"

Column 18, Claim 23, Line 20:
"elements" should be — element —

Column 18, Claim 26, Line 55:
After "comprising" insert -- : --

Signed and Sealed this
Fourteenth Day of March, 2023

Katherine Kelly Vidal
*Director of the United States Patent and Trademark Office*